United States Patent Office 3,418,238
Patented Dec. 24, 1968

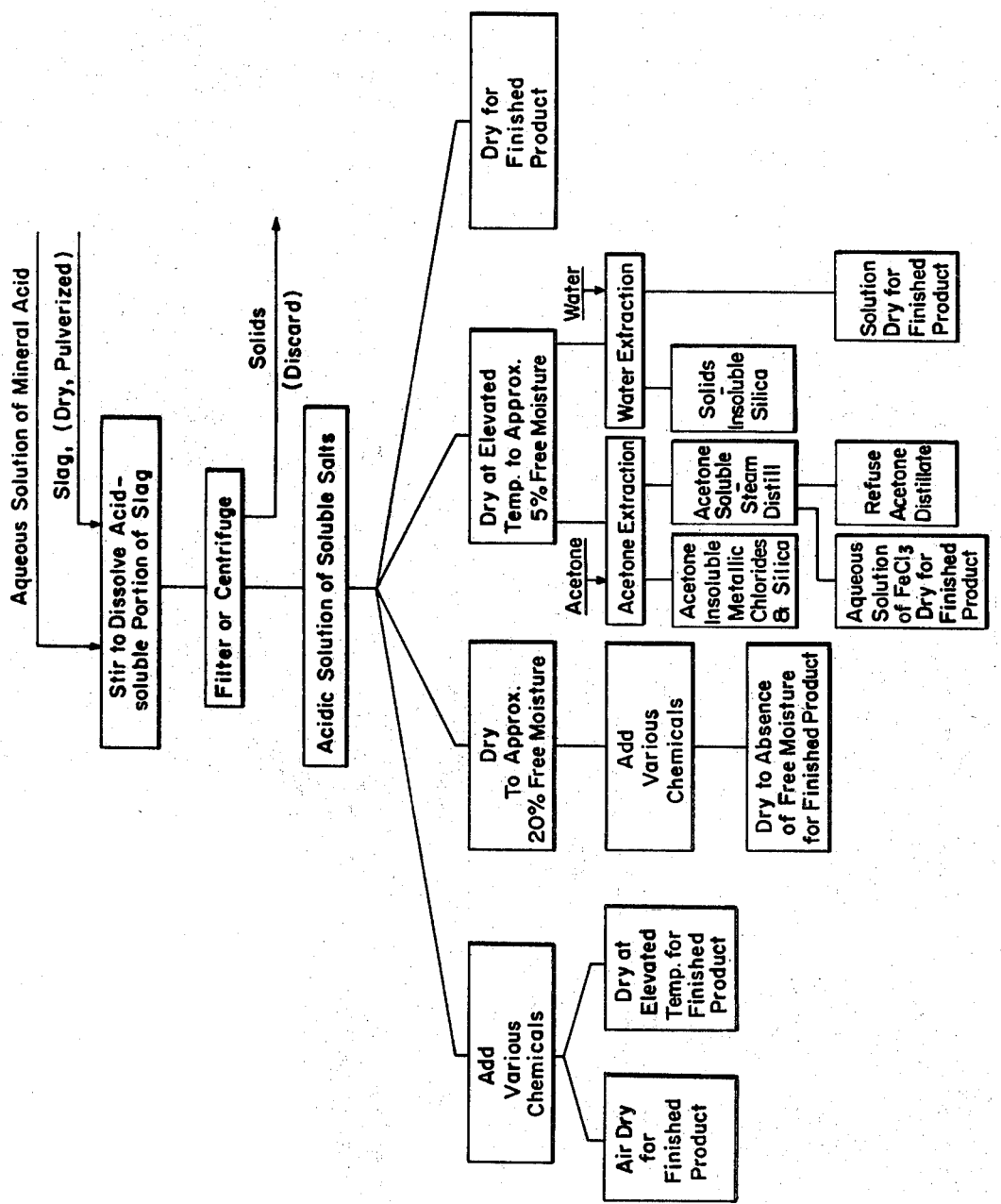
Harold W. Wilson
INVENTOR.

3,418,238
PROCESS FOR PREPARING ADDITIVE-MODIFIED SILICA GELS
Harold W. Wilson, El Paso, Tex., assignor of fifty percent to Wilson Laboratories, Inc., El Paso, Tex., a corporation of Texas, and ten percent each to Jack W. Flowers, Waco, Tex., James H. Maxey, Fresno, Calif., David C. Case, Wesley D. Rogers, Jr., and Vernon E. Thompson, Lubbock, Tex.
Filed Mar. 19, 1965, Ser. No. 441,009
7 Claims. (Cl. 252—1)

ABSTRACT OF THE DISCLOSURE

A process for the preparation of a modified silica gel derived from mineral acid extracts of waste slag resulting from the reverberatory refining of copper pyritic type ores which comprises treating the slag with an aqueous solution of at least one mineral acid to dissolve the acid-soluble portion of the slag under conditions whereby the temperature of the slag-acid system does not generally exceed 175° F. so that the formation of a silica gel is avoided, separating the resulting mineral acid solution from the solid and insoluble residue, modifying the silicic acid dihydrate containing solution by the addition of chemicals to be carried by the silica and altering the hydrogen ion concentration of the silicic acid dihydrate by driving off water so as to convert the silicic acid dihydrate to silicic acid monohydrate at which point the system gels to provide a modified silica gel which acts as a carrier for the added chemicals.

This invention relates to the preparation of a large number of chemical products of highly varied compositions which are produced by combining various chemical compounds with variable acid content crystalloid-colloid systems recovered from treating set amounts of finely pulverized waste copper slag with varying amounts of aqueous solutions of any one or mixtures of any two or more mineral acids comprising, sulfuric acid ($H_2SO_4$), hydrochloric acid (HCl), nitric acid ($HNO_3$), phosphoric acid ($H_3PO_4$), and perchloric acid ($HClO_4$). Further, due particularly to the presence of the dispersed dihydrated silica ($H_4SiO_4$) as silicic acid dihydrate in the crystalloid-colloid systems obtainable from the acid treatment of the slag, the end products producible have greatly enhanced physical and chemical properties over products which contain similar chemical compounds but lack any content of this colloidal silica entity.

In copending U.S. patent applications Ser. No. 348,063, filed Feb. 28, 1964, now U.S. Patent No. 3,273,997, issued Sept. 20, 1966; Ser. No. 350,777, filed Mar. 10, 1964, now U.S. Patent No. 3,269,831, issued Aug. 30, 1966; and Ser. No. 382,602, filed July 14, 1964, now U.S. Patent 3,288,597, issued Nov. 29, 1966. I have described processes for the separation, isolation and recovery of certain metallic and nonmetallic constituents of waste slag from the reverberatory refining of copper pyritic type ores. In these applications I have described the use of 4 normal concentration solutions of all of the above named mineral acids except phosphoric acid for dissolving the acid soluble portion of the waste slag by mixing the slag and acid for at least about 8 minutes under conditions such that the two are not permitted to reach a temperature of 175° F. whereby the formation of silica gel is avoided to produce acidic solutions containing the acid soluble components of the so-treated slag and acid-insoluble residues which are discarded. In addition, I proposed the use of oxidizing agents to be introduced into the acid solution both before and after its use in the solvation of the slag. Also, I proposed additional processing of the solution of acid solubles either as a solution or after being converted to a dry solid for the separation, isolation, and recovery of certain metallic and nonmetallic constituents therein.

The process of the instant invention differs from that described in the above noted application in several respects as will appear from the description which follows:

In the process of the instant invention the crystalloid-colloid system containing the acid soluble components of the treated slag is not processed for separation, isolation, and recovery of its metallic and nonmetallic constituents.

A principal object of this invention is the provision of a process for the preparation of chemical products by introducing chemical additives into mineral acid extracts of waste slags derived from reverberatory refining of copper pyritic type ores.

A more specific object of the invention is the treatment of mineral acid extracts of such waste slags without the separation, isolation, and recovery of its metallic and nonmetallic constituents, but rather during its conversion into a state of gelation has added to it or is combined with one or more specific chemical compounds after which, some, most, or all of its content of free water is removed to produce desired end products.

These and other objects are accomplished by the process shown schematically in the drawing in the nature of a flow sheet accompanying this application which illustrates various alternatives in the process constituting this invention.

As far as choice of chemical additives, such choice in most cases would center about the compatibility of such additives with the system involved, although in many cases incompatible additives would be used to bring about certain favorable reactions to produce desired end products.

Waste copper slag of the same general chemical composition and degree of fitness as specified for use in the patents noted supra is used in the present invention. Likewise, the concentration of the mineral acids, other than phosphoric are of the same specified normality where their method of preparation, their temperatures, and their method of use are the same. The time and manner of mixing the acid solutions with the slag and the methods of separation of the insoluble residue from the solution of acid solubles are also the same as specified in my above patents.

With the use of phosphoric acid, in order to obtain the optimum degree of slag solvation and yet prevent gelation of the slag-acid mix before separation of the acid solubles, a concentration of approximately 16%–18% by volume of 86% $H_3PO_4$ in water (or its equivalent) is required, where, with each part by weight in grams of slag used 2¾ parts by volume in cc. of the 16%–18% phosphoric acid solution are required. With the use of any one or a mixture of any of the mineral acids named, including phosphoric acid, concentrations of acid as low as 1% (in sufficient volumes) will effect complete solvation of the acid soluble components of the slag and will result in a system that after the removal of the acid-insoluble residue can be jelled. Thus, the use of acid solutions of very low concentrations may be desirable for the slag solvation such that the resultant acid solubles system contains very large amounts of water to permit complete solubilization of large amounts of soluble chemical additives if such are introduced. For example, with the use of acid solutions of concentrations in the range of 1% an additive such as phosphorous pentoxide could be introduced into the recovered acid soluble system where this specific chemical being an anhydride would have tremendous affinity for the water of the system and would form phosphoric acid and metal phosphate salts to the extent that the system would be converted from a liquid state into a solid state. There are a manifold number of other examples citable.

By use of mixtures of the named mineral acids for slag solvation, the system of acid solubles obtained can be made to contain cations of varying valence states and dissolved metallic salts containing chosen anions. For example, by treatment of the waste slag with a 4 normal concentration solution of mixed hydrochloric acid and nitric acid prepared by diluting 3 volumes of 37% HCl (12 normal) with 6 volumes of water and mixing with a solution prepared by diluting 1 volume of nitric acid (16 normal) with 3 volumes of water, the acid soluble system separated from the acid-insoluble residue will contain both nitrate and chloride salts of calcium, magnesium, both ferrous and ferric iron, both cuprous and cupric copper, both manganous and manganic manganese, zinc, aluminum, and molybdenum. By varying both quality and quantity of individual mineral acids used as well as by varying the quality and quantity of a mixture of mineral acids used for treating any given amount of slag, a tremendous number of variations of end products can be produced. In addition to this manner of creating this wide variability of end products, solutions of singular acids or mixtures of the same or other mineral acids used initially may be added to the acid soluble system after its separation from the acid-insoluble residue to produce products having much higher concentrations of acid ingredients than possible otherwise. For example, 100 gm. of slag are treated with a solution composed of 50 cc. of 86% $H_3PO_4$ and 225 cc. of water. After mixing the slag and acid together for about 8 minutes the acid solubles are separated from the acid-insoluble residue by filtration. The acid solubles system is treated with an additional 10 cc. of 86% $H_3PO_4$ to form a gel instantly which upon drying contains the equivalent of 83% $H_3PO_4$.

If, in place of using 50 cc. of the phosphoric acid, as little as 2 additional cc. (or 52 cc. total) had been used in the same volume of water, within only a few minutes of combining the acid solution with the slag (or vice-versa) the mixture would have jelled and separation would be impossible. So by use of the process of adding more acid to the acid soluble solution after its separation from the acid-insoluble residue it is possible to greatly increase the acid concentration of the system as it is also possible to introduce different anions, to effect oxidation, to alter the composition of the salt content of the final product, and to effect a myriad number of changes of the final product at will.

The instant invention takes advantage of both the presence and the chemical activity of the silicic acid dihydrate present in the crystalloid-colloid system. By altering the hydrogen ion concentration of this system by any of several means it is possible to regulate both the rate of formation and the nature of the final state of the silica. By introducing either acidic or basic chemicals into the system, by effecting a reduction or increase of ionizability of the system, by introducing water soluble compounds, by allowing or causing loss of water from the system, and by other means it becomes possible to upset the stability of the silicic acid dihydrate and effect conversion into silicic acid mono-hydrate at which point the system jells.

The rate of dehydration of the silicic acid dihydrate appears to be directly related to the rate of change of hydrogen ion concentration. To illustrate, rapid additions of relatively small amounts of concentrated acids or bases, or even water, will produce instant gelation of the system in and about the immediate area of contact by such additions. Mixing of the jelled portion into the unjelled portion will neither cause gelation of the unjelled nor cause redispersion (apparent solution) of the jelled portion. Only further addition of the hydrogen ion concentration-disturbing-agent will bring about complete gelation of the entire system. Once the system is converted into the gel state it cannot be reversed as an irreversible gel is formed. With this semidehydration of the silica of the system and the attenuant gel formation of the system, chemical substances other than silica present as a consequence of the acid solvation of the slag, or chemical substances which were incorporated into the acid soluble system after its separation and prior to forming a gel state will be found present within the gel structure. By regulating the rate of drying, all the way from permitting synergesis (sweating) to occur which upon completion leaves on the average approximately 20% water in the system in its "dry" state to using elevated temperatures to "forcefully" eliminate excess water of the gel system up to a state of eliminating all "free" water from the end product, the amounts of chemical substances bound within the gel structure can be regulated.

If other chemical substances were added to the system before or during its conversion into the gel state and into the "dry" form these substantially will also be found within and without the silica structures in a degree relative to the state of silicic acid dehydration at the time of their addition. Slow drying of a gel produced with slag and sulphuric acid by exposure to atmospheric temperature and pressures results in a product of which over 80% of the silica holds less than 15% of the metallic sulphates present within the structures, while with the same type system dried rapidly at a temperature of about 225° C. the silica structures hold between 60% to 70% of the metallic sulphates of the system. Especially with products prepared from the use of phosphoric acid the water solubility of the slowly dried system is several times greater than that of the rapidly dried system as is the percentage of soluble salts found present from water extraction of the former in contrast to the latter far higher. Thus, in some cases elevated temperature and rapid drying would be preferred while in other cases very slow, ranging through more rapid rates of drying would be preferred.

Metallic salts, predominantly salts of iron are produced by the following acids singularly in solvation of the slag followed by gelation and drying of the resultant system of acid solubles separated from the acid-insoluble residue; sulphuric, hydrochloric, phosphoric, and nitric to produce 70% to 90% equivalent contents of ferrous sulphate, ferric chloride, ferrous acid phosphate, and ferric nitrate for use in water purification, in agriculture, for manufacture of iron pigments, in dyeing, photoengraving, and photography, and for chlorination and oxidation. These products can be "packed" with high equivalent acid contents by adding concentrated acid to the crystalloid-colloid system before gelation takes place to produce such products as the following: Over 80% equivalent sulphuric acid, over 50% equivalent hydrochloric acid, over 90% equivalent phosphoric acid, and over 40% equivalent nitric acid.

Recovery of hydrogen chloride gas by heat volatilization of high hydrochloric acid equivalence products produced in accordance with the instant process, would mean that such product could be shipped with minimum hazard and cost in contrast to shipment of concentrated solutions of hydrochloric acid and at its destination the heat volatilized hydrogen chloride could be forced through water to provide high concentration hydrochloric acid solutions. Similarly, water extraction of high equivalent sulphuric acid products will produce solutions of high sulphuric acid content quite suitable for metal "pickling," etc., cleaning operations.

Water extraction of this class of products would serve to remove the silica leaving aqueous solutions of the metallic salts of the acid and free acid. These solutions would find many uses in the fields of both industrial and agricultural chemistry. Chemical compounds which can be added to the crystalloid-colloid system before, during, or after gelation are quite numerous considering the fact that they may be inorganic or organic acidic, basic, or neutral substances.

In this description wherever reference is made to "slag" such reference is made to the waste product obtained from copper pyritic type ores which have been processed by the metallurgical process known as reverberatory refining. The following approximate composition is typical of such waste slag:

| | Percent |
|---|---|
| Iron expressed as Fe (and present as metal oxides, and silicates) | 28–32 |
| Silicon dioxide (present as mixed silicates of iron, calcium, aluminum and magnesium) | 32–38 |
| CaO (present as basic silicate) | 8–10 |
| Zinc | 2–3 |
| Lead | <0.5 |
| Copper | 0.3–0.5 |
| Sulphur (as metal sulfides) | <1 |

After the initial treatment of the slag, in which the acid soluble portion of the slag is dissolved, the acid insoluble residue is separated from the acid soluble portion by vacuum or pressure filtration or by centrifuging. Any residual acid soluble material is removed from the soluble residue by washing the residue with water. The washings are combined with the acid-insoluble solution. The liquid portion obtained from the above process may be treated by any of several embodiments of the process of this invention, each of which is different from the processes described in my above-noted patents.

Example I

The acid solubles system obtained from treating 100 gm. of slag with 225 cc. of water and 50 cc. of 86% phosphoric acid after being separated from the acid-insoluble residue is combined with 130 gram of urea. The resultant product after being dried at 70°–80° C. temperature weighs 224 grams and contains approximately 25% total nitrogen and 25% citrate soluble $P_2O_5$. The product is used as a source of the primary plant nutrients, nitrogen and phosphorous and also contains all secondary and micro nutrients required for optimum plant growth. It would be marketed under the designation, "25–25–0."

Example II

The acid solubles system obtained from treating 160 gm. of slag with a mixture of 335 cc. of water and 40 cc. of 98% sulfuric acid after being separated from the acid insoluble residue is allowed to air dry to a water content of approximately 20%. 50 cc. of 28% $NH_3$ content ammonium hydroxide is mixed with the dried material and the resultant mix dried to a total loss of water at a temperature of 100° C. after which it is extracted with water and the insoluble portion separated from the soluble portion by filtration. The insoluble portion after drying at 100° C. temperature weighs approximately 100 grams and is predominantly a mixture of ferric oxide hydrate (75%) and dehydrated silica (25%) and is suitable for use as a surface coating pigment material. The soluble portion may be processed for recovery of its ammonium sulfate content amounting to approximately 50 grams in weight.

Example III

The acid solubles system obtained from treating 100 gm. of slag with a mixture of 140 cc. of water and 70 cc. of 37% hydrochloric acid after being separated from the acid-insoluble residue is dried at a temperature of 150° C. to a moisture content of 5%–10%. The weight of the resultant product is approximately 80 grams and contains approximately 70% mixed ferrous-ferric chlorides, approximately 15% silica, the moisture, and about 4% mixed metal chlorides of calcium, magnesium, aluminum, copper, and zinc make up the balance. The hydrochloric acid equivalence of this product is about 38% HCl. This product finds use in water treatment, manufacture of inks and dyestuffs, for chlorination of copper ores, and in many industrial applications.

Example IV

An acetone extraction of the product obtained in Example III selectively removes the iron chlorides present in the material into the acetone and leaves a residue of silica and insoluble metal chlorides other than iron. A steam distillation of the acetone and iron chloride mix removes the acetone for reuse and leaves an aqueous solution containing dissolved ferric chloride ($FeCl_3$) which may be recovered as nearly pure $FeCl_3$ by evaporating the water from the solution. Such treatment of the product obtained as described in Example III using the amount of materials noted resulted in obtaining approximately 50 grams of 99% pure ferric chloride and approximately 55 grams of silica and mixed metal chlorides other than iron. This purity ferric chloride has a very wide use in industry as a prime industrial chemical.

Example IV–A

The acid solubles resulting from treatment of the slag with any one or a mixture of several of the named acids after being separated from the acid insolubles may be combined as solutions or may be combined while, during or after becoming gels with various chemical compounds known as plant nutrient chemicals, such as nitrate, phosphate, sulphate, and chloride salts of ammonium, sodium, potassium, calcium, magnesium, iron, copper, zinc, and manganese. Additionally, the soluble systems may be combined with additional amounts of mineral acids to produce products having a high acid equivalency. By use of such processes many products can be produced which contain varying qualities and quantities of the so-called "primary plant nutrients," nitrogen phosphorus, and potassium. The quality and quantity which can be prepared by use of the acid solubles systems and added plant nutrient chemicals and/or additional amounts of concentrated mineral acids are shown by the ratios below, where the first number of the ratio represents percent total nitrogen, the second number represents percent available $P_2O_5$, and the third number represents percent water soluble $K_2O$; a minimum of zero for any one, two, or all three such as 20–0–0, 0–50–0, 0–0–19, a maximum of 60 when all three are present such as 20–20–20, 30–0–30, 10–30–20, etc.; and a maximum of 30 for total nitrogen, a maximum of 60 for available $P_2O_5$, and a maximum of 30 for $K_2O$.

Example V

The acid solubles system obtained from treating 50 gm. of slag with a mixture of 112 cc. of water and 25 cc. of 86% phosphoric acid after being separated from the acid-insoluble residue is combined with 67 grams of urea, 57 grams of potassium sulfate, and 5 cc. of 86% phosphoric acid. The resultant product after drying at 100° C. temperature weighed 174 grams and contained approximately 17.5% N, 17.5% available $P_2O_5$, and 17.5% $K_2O$.

Example VI

The acid solubles system obtained from treating 200 grams of slag with a mixture of 430 cc. of water and 50 cc. of 98% sulfuric acid after being separated from the acid-insoluble residue is combined with 240 grams of urea. The resultant product after being dried at 60°–70° C. temperature weighed 180 grams and contained approximately 30% total nitrogen.

Example VII

The acid solubles system obtained from treating 100 grams of slag with a mixture of 215 cc. of water containing 25 cc. of 98% sulfuric acid after being separated from the acid-insoluble residue is combined with 60 grams of trisodium-N-hydroxyethylenediaminetriacetate and the mixture dried to give approximately 120 grams of product containing chelates of all of the metallic salts present in the solubles system. This product is used as a micronutrient source for plant life and similar type products already have wide acceptance in agricultural chemical applications. Likewise valuable are chelated metals for certain industrial applications. Selective chelation of selected metals of the acid solubles system is possible and additional agents other than the one specified above may be used in this application.

Example VIII

The acid solubles system obtained from treating 100 grams of slag with a mixture of 215 cc. of water and 25 cc. of 98% sulfuric acid after being separated from the acid-insoluble residue is combined with 30 grams of copper hydroxyacetate and the resulting gel system is allowed to dry at room temperature to produce approximately 100 grams of product containing about 10% copper content predominantly as the cuprous form. Other copper compounds may be used similarly and the amounts varied to produce varying copper concentration end products. Example VIII–A. The acid solubles system obtained from treatment of 50 grams of slag with a mixture of 60 cc. of water and 30 cc. of 37% HCl after being separated from the acid-insoluble residue is combined with 15 grams of cuprous chloride, and the mixture after air drying gives approximately 50 grams of product containing about 20% cuprous copper. These products are active herbicides and have wide usage in the field of agriculture.

Example IX

In addition to preparing herbicides by introducing copper compounds into the various acid solubles systems possible, many types of organic compounds possessing valuable herbicidal properties may be introduced into the systems. To illustrate, compounds such as the phenoxy acetic acid derivatives such as 2,4–D, and 2,4,5–T and propionic acid derivatives such as 2-(2,4–DP) can be employed, as can also the chlorophenoxy derivatives such as MCPA, 4-(2-methyl-4-chlorophenoxy)butyric acid, and 4-(2,4-dichlorophenoxy)butyric acid. The only restriction on use of either inorganic or organic compounds rests with either selecting solvation mineral acids for the slag solvation with which the compound introduced will be compatible, or introducing agents into the acid solubles system to neutralize acidic components and render the system neutral if necessary to obtain the degree of compatibility between all chemicals of the gel prior to drying. As an example, the use of a copper carbonate would cause liberation of $CO_2$ by the acid of the system, however, this would not affect the copper other than its concentration in the end product. On the other hand, if certain amine type compounds were used, before their introduction the acid solubles solution may have to be rendered neutral by the addition of ammonia such that the amine type compound would remain stable.

Example X

In addition to the acid solubles system being convertible into both sources of plant nutrients as well as herbicidal carriers, these systems can be converted into fungicide and pesticide carriers. And, it can easily be followed that a combination of all of these properties could be imparted to products preparable from introduction of many different chemicals all at one time into the properly formulated acid solubles system.

In this description wherever reference is made to a "packed" slicia gel such reference is made to a silica gel which has been modified by the addition of various inorganic and/or organic acidic, basic, and/or neutral chemical compounds.

I claim:

1. A process for the preparation of an additive modified silica gel by the modification of mineral acid silicic acid-dihydrate-containing extracts of waste slag resulting from the reverberatory refining of copper pyritic type ores which comprises: crushing the slag; adding an aqueous solution of at least one mineral acid having a normality of about 4 and selected from the group consisting of hydrochloric, sulfuric, nitric, phosphoric, perchloric, and mixtures of said acids with one another to said crushed slag; mixing the slag and acid for about 8 minutes in such a manner that the two are not permitted to reach a temperature exceeding about 175° F. to dissolve the acid-soluble portion of the slag so that the formation of a silica gel is avoided; separating the resulting mineral acid silicic-acid-dihydrate-containing solution of the acid-soluble values formerly present in the so-treated slag from the solid acid insoluble residue; introducing compatible additives selected from the group consisting of:

(a) carbonate, nitrate, phosphate, sulphate, and chloride salts of ammonium, sodium, potassium, calcium, magnesium, iron, copper, zinc and manganese;
(b) mineral acids;
(c) mineral acid anhydrides;
(d) ammonia and aqueous solutions thereof;
(e) amines;
(f) urea;
(g) organic herbicides, fungicides and pesticides;
(h) chelating agents; and
(i) admixtures of the foregoing.

to said silicic-acid dihydrate containing solution; altering the hydrogen ion concentration of said additive modified silicic-acid dihydrate-containing solution by drying to effect conversion of the silicic acid dihydrate to silicic acid monohydrate so as to bring about gelation of the additive modified solution to obtain an additive modified silica gel.

2. The process of claim 1 wherein the additive modified silicic acid dihydrate containing solution is air dried to effect conversion of the silicic acid dihydrate to silicic acid monohydrate.

3. The process of claim 1 wherein the additive modified silicic acid dihydrate containing solution is dried at an elevated temperature up to about 225° C. to effect conversion of the silicic acid dihydrate to silicic acid monohydrate.

4. The process of claim 1 including, as additional steps subsequent to the last step set forth in claim 3, the steps of: extracting the Fe salts with acetone; recovering the silica and insoluble chlorides solid residue; and drying the solid residue to recover an additive modified silica gel.

5. The product produced by the process of claim 1.

6. The process of claim 1 wherein the additive modified mineral acid silicic acid dihydrate containing solution is dried at an elevated temperature up to about 225° C. to a free moisture content of about 5% to 10%.

7. A process for the preparation of products from water extraction of an additive modified silica gel prepared by the modification of mineral silicic-acid dihydrate-containing extracts of waste slag resulting from the reverberatory refining of copper pyritic type ores which comprises: crushing the slag; adding an aqueous solution of at least one mineral acid having a normality of about 4 and selected from the group consisting of hydrochloric, sulfuric, nitric, phosphoric, perchloric and mixtures of said acids with one another to said crushed slag; mixing the slag and acid for about 8 minutes in such a manner that the two are not permitted to reach a temperature exceeding about 175° F. to dissolve the acid-soluble portion of the slag so that the formation of a silica gel is avoided; separating the resulting mineral acid silicic-acid-dihydrate-containing solution of the acid-soluble values formerly present in the so treated slag from the solid acid insoluble residue; altering the hydrogen ion concentration of said silicic-acid-dihydrate-containing solution by air drying to about 20% free moisture to effect conversion of the silicic acid dihydrate to silicic acid monohydrate at which point the solution gels; introducing compatible additives selected from the group consisting of:

(a) carbonate, nitrate, phosphate, sulphate, and chloride salts of ammonium, sodium, potassium, calcium, magnesium, iron, copper, zinc and manganese;
(b) mineral acids;
(c) mineral acid anhydrides;
(d) ammonia and aqueous solutions thereof;
(e) amines;
(f) urea;
(g) organic herbicides, fungicides and pesticides;
(h) chelating agents; and
(i) admixtures of the foregoing—
to said partially dried silica gel; drying said partially dried additive modified silica gel to total loss of free water; and subsequently extracting the water soluble constituents from said dried silica gel; and drying the water soluble portion recover silica-free product.

References Cited

UNITED STATES PATENTS

| 3,269,832 | 8/1966 | Wilson | 75—108 |
| 3,273,997 | 9/1966 | Wilson | 75—108 |
| 3,288,597 | 11/1966 | Wilson | 75—108 |

LEON D. ROSDOL, *Primary Examiner.*

I. GLUCK, *Assistant Examiner.*

U.S. Cl. X.R.

75—108; 252—317, 182